US006793690B2

(12) United States Patent
Kudoh et al.

(10) Patent No.: US 6,793,690 B2
(45) Date of Patent: Sep. 21, 2004

(54) CONDUCTIVE COMPOSITION PRECURSOR, CONDUCTIVE COMPOSITION, SOLID ELECTROLYTIC CAPACITOR, AND THEIR MANUFACTURING METHOD

(75) Inventors: Yasuo Kudoh, Yokohama (JP); Kenji Akami, Atsugi (JP); Hiroki Kusayanagi, Kawasaki (JP); Yasue Matsuya, Sagamihara (JP)

(73) Assignee: Matsushita Electric Industrial Co., Ltd. (JP)

(*) Notice: Subject to any disclaimer, the term of this patent is extended or adjusted under 35 U.S.C. 154(b) by 47 days.

(21) Appl. No.: 10/337,369

(22) Filed: Jan. 7, 2003

(65) Prior Publication Data

US 2003/0147202 A1 Aug. 7, 2003

Related U.S. Application Data

(62) Division of application No. 09/660,447, filed on Sep. 12, 2000, now Pat. No. 6,602,741.

(30) Foreign Application Priority Data

| Sep. 14, 1999 | (JP) | 11-260122 |
| Nov. 24, 1999 | (JP) | 11-332303 |
| Mar. 31, 2000 | (JP) | 2000-097331 |
| May 16, 2000 | (JP) | 2000-142843 |
| Jun. 23, 2000 | (JP) | 2000-188927 |

(51) Int. Cl.[7] .............................................. H01G 9/00
(52) U.S. Cl. .................. 29/25.03; 29/25.43; 361/523; 361/525; 361/528; 361/529
(58) Field of Search .................... 361/523, 525, 361/528, 516, 529, 433, 562, 508, 509, 512, 530; 29/25.03, 25.42; 252/62.2

(56) References Cited

U.S. PATENT DOCUMENTS 5,232,631 A 8/1993 Cao et al.
5,729,428 A * 3/1998 Sakata et al. ............... 361/523
6,154,358 A * 11/2000 Fukaumi et al. ............ 361/523
6,206,937 B1 * 3/2001 Kudoh et al. ............... 29/25.03
6,215,651 B1 * 4/2001 Takada et al. .............. 361/523
6,430,033 B1 * 8/2002 Mitsui et al. ............... 361/525

FOREIGN PATENT DOCUMENTS

JP    06206986 A    7/1994

OTHER PUBLICATIONS

"Water–Soluble Self Doped 3–Substituted Polypyrroles", by E E Havinga et al., pp 650–659. Chemistry of Materials, vol. 1, 1989, no date/month.

"3.4–Polyethylenedioxythophene (REDT) Conductive Coatings Technical Applications and Properties", by F Joans et al. pp 1397–1398. Synthetic Metals 85 (1997), no month/date.

"Novel Organosynthetic Routes to Polythoiphene and its Derivatives", by Hotta et al., pp 267–279. Synthetic Metals. 26(1968), no month/date.

"Synthesis and Applications of Sulfonated Polyamline", by S Shimizu et al. pp 1337–1338. Synthetic Metals 85(1997), no month/date.

* cited by examiner

Primary Examiner—Dean A. Reichard
Assistant Examiner—Nguyen T. Ha
(74) Attorney, Agent, or Firm—Parkhurst & Wendel, L.L.P.

(57) ABSTRACT

Method of manufacturing a conductive composition precursor prepared by dispersing or dissolving at least one additive having high dielectric layer repairing ability in conductive polymer solution, the conductive composition made by removing a medium or solvent from this composition precursor. The additive is at least one of "phosphoric acid or phosphoric acid ester compounds", "phenol or phenol derivatives", "nitrobenzene derivatives", "alkyl or naphthalene sulfonic acid anion", "fluorocarbon surface active agent" and "fluorocarbon surface active agent and binder."

24 Claims, 4 Drawing Sheets

CONDUCTIVE COMPOSITION PRECURSOR, CONDUCTIVE COMPOSITION, SOLID ELECTROLYTIC CAPACITOR, AND THEIR MANUFACTURING METHOD

This is a divisional of application Ser. No. 09/660,447 filed Sep. 12, 2000 now U.S. Pat. No. 6,602,741.

FIELD OF THE INVENTION

The present invention relates to conductive composition precursors, conductive compositions, solid electrolytic capacitors, and their manufacturing methods, and more particularly to conductive compositions with high dielectric layer repairing ability and solid electrolytic capacitors with good withstand voltage employing such conductive compositions.

BACKGROUND OF THE INVENTION

Demand for small high-capacitance capacitors with low impedance at high frequencies is growing in response to the increasing digitization of electric appliances. Conventional capacitors used at high frequencies include mica capacitors and multi-layered ceramic capacitors. Downsizing of these capacitors, however, is difficult to reconcile with maintenance of large capacity.

Typical large-capacitance capacitors are electrolytic capacitors such as aluminum electrolytic capacitors and aluminum or tantalum solid electrolytic capacitors. The extremely thin anodized layer which becomes the dielectric of these capacitors allows them to achieve large capacitance. On the other hand, thin anodized layers are fragile, and thus these capacitors require electrolytic substances to allow them to repair themselves.

For example, in aluminum electrolytic capacitors, an etched positive electrode and aluminum foil forming the negative electrode are wound together, providing a separator in between, and the separator is impregnated with liquid electrolyte. This liquid electrolyte has ion conductivity and large specific resistance, resulting in large losses which significantly degrade the frequency characteristics as well as the impedance and temperature characteristics. Moreover, leakage of liquid and evaporation of solvent are inevitable, resulting in reduced capacitance and increased loss as time passes. Solid tantalum electrolytic capacitors use manganese oxides as their electrolyte for improved temperature characteristics and reduced secular change of capacity and loss. However, the relatively high specific resistance of manganese oxide results in poor impedance frequency characteristics compared to multi-layered ceramic capacitors and film capacitors. To counter this disadvantage, solid aluminum and tantalum electrolytic capacitors with high electric conductivity employing conjugated double bond conductive polymer are proposed.

In general, conjugated double bond conductive polymers, typically poly-aniline and poly-thiophene, are prepared by chemical oxidative polymerization and electro-polymerization.

Application of electro-polymerization puts a limit on mass production because conductive polymer are formed on an electrode in a film. In contrast, application of chemical oxidative polymerization is free from such restrictions, and allows a large volume of conductive polymer to be relatively easily produced by reacting a monomer using an oxidizing agent.

In order to use such conductive polymer as the negative electrode conductive layer of a solid electrolytic capacitor, it is important to provide the conductive polymer with high environmental stability and high dielectric layer repairing ability.

The conductive polymer consists of polymer as a main component and dopant. Selection of dopant anionic material or introduction of an appropriate substitute group for monomer has conventionally been applied to improve environmental stability of the conductive polymer. In particular, a number of studies have been carried out on the use of thiophene as the monomer by introducing the ethylene dioxy group to its $\beta$, $\beta$ positions (3, 4 positions) for creating a conductive composition with high environmental stability.

It is generally thought that the dielectric layer of the conductive polymer used in the solid electrolytic capacitor is self-repaired by the change of the conductive polymer to insulating polymer as a result of the joule heat generated by the current flowing the dielectric layer defect portion. Conventionally, the dielectric layer formed by anodization is thickened to achieve a solid electrolytic capacitor with high withstand voltage, using conductive polymer for the negative electrode conductive layer. In other words, the anodization voltage is often increased to thicken the dielectric layer. Another approach is the use of anionic compounds which have high dielectric layer repairing abiltiy as dopants for in-situ formation of the negative electrode conductive layer consisting of conductive polymer.

Still another approach is to carry out in-situ polymerization in the presence of phenol derivatives to form a negative electrode conductive layer consisting of conductive polymer to provide high dielectric layer repairing ability and thus to achieve a capacitor with high withstand voltage. However, the strategy of increasing the anodization voltage during the formation of the dielectric layer to allow a sufficient margin against the applied voltage with the aim of securing a high withstand voltage thickens the dielectric layer in proportion to the rated voltage, causing the undesirable result of reducing the capacitance of the capacitor.

In addition, it is difficult to achieve both sufficiently high environmental stability, particularly high heat resistance in the air, and high dielectric layer repairing ability at the same time using a single dopant, although the properties of the polypyrrole are changeable by types of dopant used.

Accordingly, several dopants are often used in some approaches, but it is still difficult to achieve a conductive polymer with high heat resistance and high layer repairing ability because doping ability varies among dopants and the control of individual doping ratio is difficult.

The use of additives for improving the layer repairing ability has also been studied, but most of the additives that are added to the polymerizing solution for in-situ polymerization are removed during the rinsing for removal of polymerization residue, and thus sufficiently high layer repairing effects are not achieved.

The repairing ability of conductive polymer using anionic materials, which have a high anodization layer repairing ability, as dopants, still confers a low level of repairing ability combined with low withstand voltage.

However, there is strong market demand for solid electrolytic capacitors using conductive polymer with withstand voltages the same with those of general electrolytic capacitors.

SUMMARY OF THE INVENTION

The present invention aims to offer conductive composition precursors and a method for manufacturing conductive compositions having high withstand voltage and high layer repairing ability for overcoming the disadvantages of the prior art.

Moreover, the present invention provides a method of manufacture solid electrolytic capacitors showing high withstand voltage, heat resistance, and moisture resistance, utilizing the features of the conductive polymer of the present invention.

The present invention provides, conductive composition precursor made by dispersing or dissolving an additive having high dielectric layer repairing ability into a conductive polymer solution in which soluble conductive polymer is dissolved or into a conductive polymer dispersion into which conductive polymer particles are dispersed;

conductive composition achieved by removing the medium or solvent; and a method of manufacturing a solid electrolytic capacitor using the conductive composition of the present invention.

The present invention uses at least one additive selected from the group of "phosphoric acid or esters of phosphoric acid," "phenol or phenol derivatives," "nitrobenzene derivatives," "alkyl naphthalene sulfonic acid anion," "fluorocarbon surface active agents," or "fluorocarbon surface active agents and binders."

The present invention also applies at least one coupling agent selected from the group of: silane coupling agent, titanium coupling agent, borane coupling agent, or aluminum coupling agent to the surface of the anodized layer for providing an extremely thin insulating layer between the anodized layer and conductive polymer. Provision of a coupling agent layer and a layer made of a surface active agent with strong affinity to this coupling agent between the anodized layer and conductive polymer prevents direct contact between the anodized layer defect portion and the conductive polymer. Accordingly, the withstand voltage is improved by preventing the electrical breakdown of conductive polymer by the current from the dielectric layer damaged portion.

DESCRIPTION OF THE PREFERRED EMBODIMENT

Figure 1:
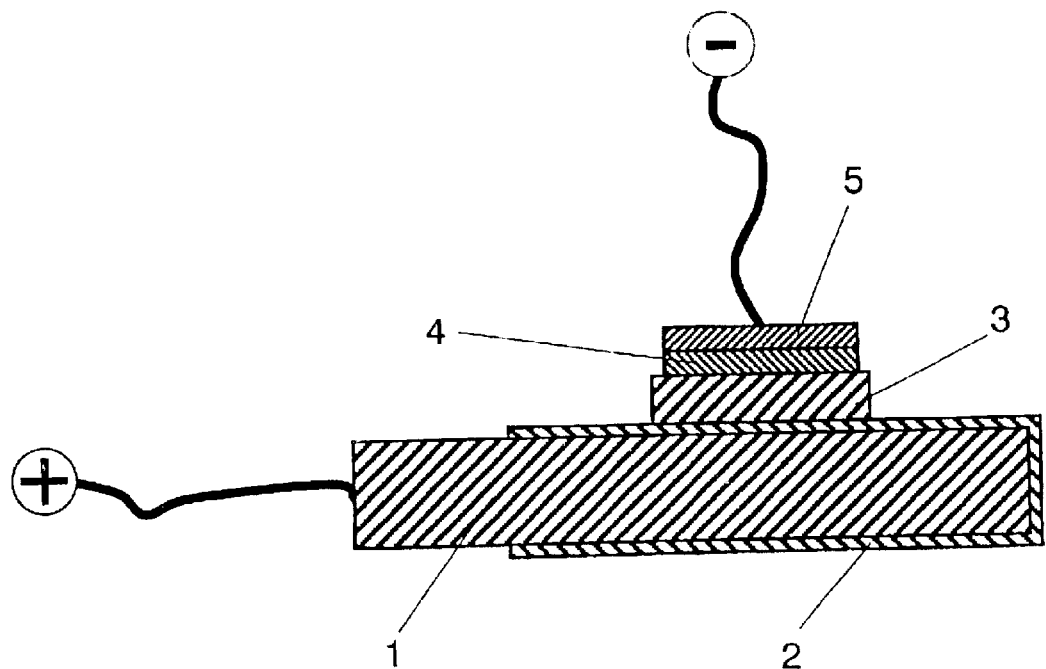
FIG. 1 is a sectional view of a configuration of a capacitor in accordance with an exemplary embodiment of the present invention.

Exemplary embodiments of the present invention are detailed next.

First Exemplary Embodiment

Whether the conductive polymer used for the present invention takes the form of particles dispersed in the medium or an intrinsic solution is a matter of controversy.

For convenience, in the following explanation of the invention, a conductive polymer solution' refers to both of the dispersion and solution. In the same way, for convenience, additives are also referred to as being "dissolved", including those dispersed in a colloidal state.

A series of methods for manufacturing the conductive polymer solution used in the present invention are already disclosed, and thus the applicable conductive polymer solution can be easily manufactured using these disclosed methods.

For example, methods of manufacturing poly-pyrroles are disclosed in Japanese Patent Laid-open Publication No. H6-206986 and by E. E. Havinga et al, Chemistry of Materials (American Chemical Society), 1 (6), pp650 (1989).

F. Yonas et al, Synthetic Metals(Elsevia Press), 85, 1397 and Hotta et al, ibid, 26, 267 disclose the methods of manufacturing poly-thiophenes.

U.S. Pat. No. 5,232,631 and Shimizu et al, Synthetic Metals, 85, 1337 disclose the methods of manufacturing polyaniline solution.

Mitsubishi Rayon Co. Ltd. sells poly-aniline solution under the trade name "Aquasave."

The present invention provides conductive composition precursor by adding at least one of "phosphoric acid or esters of phosphoric acid," "phenol or phenol derivatives," "nitrobenzene derivatives," "alkyl naphthalene sulfonic acid anion," "fluorocarbon surface active agent," or "fluorocarbon surface active agent and binder" to a conductive polymer solution.

Conductive composition can be manufactured by removing solvent or dispersing medium (hereafter referred to as medium) from the above precursor.

As known due to the frequent use of phosphoric acid or esters of phosphoric acid to form the dielectric layer of aluminum electrolytic capacitors and tantalum electrolytic capacitors, phosphoric acid or esters of phosphoric acid are known to form a barrier type oxide layer.

The present invention allows the use of salts of phosphoric acids in which at least one active hydrogen remains, as well as ortho-phosphoric acid.

As for phosphoric acid ester compounds, any compounds in which at least one active hydrogen remains and is uniformly dispersed in the conductive polymer solution may be used. However, the use of esters of alkyl phosphoric acid including 3 to 8 carbons are preferable.

Anodized layer formation may occur to a sufficient degree in the presence of a small amount of absorbed water supplied from the air when phosphoric acid ester compounds are added. Accordingly, the use of conductive composition of the present invention as a negative electrode conductive layer makes it possible to achieve a capacitor with improved withstand voltage due to its high dielectric layer repairing ability.

The second group of the present invention is precursors in which phenol or phenol derivatives, or benzene derivatives having nitro groups are added to a conductive polymer solution. Conductive composition precursor made of this group makes it possible to improve the repairing ability of a dielectric layer made of valve metal anodized film.

It is known that the spark discharge initiation voltage rises and withstand voltage improves as a result of addition of p-nitro-phenol or p-nitro-benzoic acid to the electrolytic solution. The inventor has found that when a solid electrolytic capacitor using conductive composition as the negative electrode conductive layer to which p-nitro-phenol and p-nitro-benzoic acid are added, it achieves high withstand voltage compared with the same kind of capacitor without ing these substances.

Phenol derivatives suitable for the present invention include phenol derivatives having electron-attracting substitution groups as well as p-nitro-phenol.

As for benzene derivatives having a nitro group, p-nitro-benzoic acid and nitro-benzyl alcohol as well as nitrobenzene are preferable.

Poly-pyrrole or its derivatives, poly-thiophene or its derivatives, and poly-aniline or its derivatives are preferable as conductive polymer solutions for adding these additives.

Conductve polymers containing dopant may be used as the above conductive polymers, and undoped polymers may also be used if they are post-doped to become conductive.

The third group of the present invention comprises solutions to which alkyl naphthalene sulfonic acid anion is added after preparing a conductive polymer solution. The conductive composition precursor of the above composition improves the repairing ability of the dielectric layer consisting of a valve metal oxide. Free acids, sodium salts, or ammonium salts may be added as alkyl naphthalene sulfonic acid anions. An alkyl group having total carbon number of 3 or above can used as the alkyl group.

A conductive composition layer can be manufactured by removing medium from the conductive composition precursor.

Alkyl naphthalene sulfonic acid or salts of alkyl naphthalene sulfonic acid contained in the conductive composition layer prevent damage of the dielectric layer, which is caused by small volume anion such as para-toluene sulfonic acid anion or naphthalene sulfonic acid anion. Therefore, if an oxidizing agent containing salts of para-toluene sulfonate or naphthalene sulfonate is used for manufacturing a conductive polymer layer on the conductive composition, a solid electrolytic capacitor with low leak current, and high heat and moisture resistances and high capacitance obtaining rate is achievable. The capacitance obtaining rate refers to the ratio of static capacitance in the finished solid electrolytic capacitor compared to the static capacitance of a capacitor element measured in an electrolytic solution.

Alkyl naphthalene sulfonic acid anion has high repairing ability, so no large current flows during re-anodization, thus preventing the decomposition of the conductive polymer layer. Accordingly, a solid electrolytic capacitor with low leak current is obtained without degrading dissipation factor and impedance.

If the surface of the valve metal is anodized using an anodizing solution containing alkyl naphthalene sulfonic acid anion, the alkyl naphthalene sulfonic acid anion is included near the surface of the dielectric layer. Alkyl naphthalene sulfonic acid anion included in or present near the surface of the dielectric layer suppress damage of the dielectric layer caused by small volume anions, such as para-toluene sulfonic acid anion.

As conductive polymers used in the conductive polymer layer, poly-pyrolle, poly-thiophene, poly aniline or their derivatives are preferably used.

In the fourth group of the present invention, fluorocarbon surface active agents or fluorocarbon surface active agent and binders are added to a conductive polymer solution. Addition of fluorocarbon surface active agent reduces the surface tension of the solution, and provides a conductive composition precursor with high coverage. Moreover, addition of a fluorocarbon surface active agent and binder, which becomes an insulating material after the medium is removed, provides a conductive composition precursor with high withstand voltage.

As for the fluorocarbon surface active agent, anionic, nonionic, amphoteric, or cationic surface active agents may be used. For example, anionic surface active agents include perfluoroalkyl carbonate and perfluoroalkyl phosphoric acid ester. Nonionic surface active agents include perfluoroalkyl amine oxide and perfluoroalkyl ethylene oxide adduct. Amphoteric surface active agents include perfluoro alkyl betaine. Cationic surface active agents include perfluoroalkyl trimethyl ammonium salts.

As for binder, polymers which dissolve or disperse in the medium of the conductive polymer solution may be used. These include polyvinyl pyrrolidone, polyvinyl alcohol, water soluble polyester, water soluble acrylic resin, carboxymethyl cellulose, salts of polyvinyl sulfonic acids, and salts of polystyrene sulfonic acid.

As for fluorocarbon surface active agents used together with binder, those having a perfluoroalkyl group are suitable.

The solid electrolytic capacitor of the present invention forms a negative electrode conductive layer by removing the medium after applying the conductive composition precursor, to which the above additives are added, on the surface of the capacitor electrode having the dielectric layer, using an appropriate method.

Phosphoric acid or esters of phosphoric acid, phenol derivatives, nitro compounds, alkyl naphthalene sulfonic acid aion, fluorocarbon surface active agents, or fluorocarbon surface active agents and binders as additives allow a solid electrolytic capacitor with high withstand voltage to be achieved.

Other conductive polymer layers may be laminated on the initial conductive composition layer by in situ polymerization as the negative electrode conductive layer, as well as the use of a single conductive composition layer obtained from the above conductive composition precursor.

Methods for in situ polymerization include electro-polymerization and chemical polymerization. Poly-pyrrole or its derivatives, poly-thiophene or its derivatives, or poly-aniline or its derivatives are preferably used as conductive polymers.

Specific examples are described below.

EXAMPLE 1

Example 1 is described with reference to FIG. 1.

First, poly-pyrrole solution is prepared using the method disclosed in Chemistry of Materials (American Chemical Society), 1(6), pp650 (1989). Conductive composition precursor containing poly-pyrrole, ortho-phosphoric acid, and medium is prepared by adding 0.01% of ortho-phosphoric acid to this poly-pyrrole solution.

The precursor is a smooth liquid similar to the solution without ortho-phosphoric acid. It also enables the creation of a conductive composition layer equivalent to that without additive when the precursor is applied to the substrate and the medium is then dried and removed.

Next, as shown in FIG. 1, an aluminum strip 1 of 99.99% purity and dimensions of 10×30×0.5 mm is prepared. After electrolytic polishing of aluminum strip 1 in sodium hydroxide solution, the strip is dipped in 3% ammonium adipate solution to a depth of approximately 20 mm, and voltage of 35 V is applied for 30 minutes at 70° C. to form anodized film 2.

The conductive composition precursor containing polypyrrole, orthophosphoric acid, and medium is applied in a 7 mm diameter-circle on one side of the aluminum strip, where anodized film is formed. The strip is then air-dried at room temperature, and heated for 10 minutes at 105° C. to form conductive composition layer 3 consisting of polypyrrole and orthophosphoric acid.

Then, colloidal graphite 4 and silver paint 5 are sequentially applied to conductive composition layer 3. An positive electrode lead is attached to a portion where the anodized film is not formed and a negative electrode lead is attached to the silver paint layer to form the capacitor. Capacitance is measured at 120 Hz.

Furthermore, a voltage is applied between both electrodes in the forward direction at an interval of 0.5 V to identify the voltage causing electrical breakdown. The results are shown in Table 1.

COMPARATIVE EXAMPLE 1

For comparison, a capacitor without added orthophosphoric acid is manufactured in Example 1 as Comparative example 1. Capacitance and electrical breakdown voltage of this capacitor are evaluated, in the same way as in Example 1, and the results are shown in Table 1.

Comparing the results shown in Table 1, Example 1 and Comparative example 1 both have almost the same capacitance. However, it is apparent that the capacitor in Example 1 has a higher withstand voltage, demonstrating that the present invention has better effect.

EXAMPLE 2

Example 2 shows the effects of addition of (A) n-propyl phosphoric acid, (B) isopropyl phosphoric acid, (C) n-butyl phosphoric acid, or (D) n-hexyl phosphoric acid, instead of ortho-phosphoric acid as seen in Example 1. Other conditions are the same as those in Example 1 for preparing conductive composition precursor.

These precursors are also smooth liquid similar to those containing no additives. A conductive composition layer identical to that with no additives is also provided by applying these-precursors to a substrate, and drying and removing the medium. A capacitor is manufactured in the same way as that in Example 1 using each of these precursors, and the same evaluations as those in Example 1 are implemented.

The results are shown in Table 1. It is apparent that all the capacitors in Example 2 have a higher withstand voltage than that in Comparative example 1, demonstrating the advantageous effect of the present invention.

EXAMPLE 3

Example 3 shows the effects of addition of (A) n-nitro phenol, (B) m-nitro phenol, or (C) n-cyano phenol, instead of ortho-phosphoric acid as seen in Example 1. Other conditions are the same as those in Example 1 for preparing conductive composition precursor.

These precursors are also smooth liquid similar to those containing no additives. A conductive composition film identical to that with no additives is also provided by applying these precursors to a substrate, and drying and removing the medium. A capacitor is manufactured in the same way as that in Example 1 using these precursors, and the same evaluations as those in Example 1 are implemented.

The results are shown in Table 1. It is apparent that all the capacitors in Example 3 have a higher withstand voltage than that in Comparative example 1, demonstrating the advantageous effect of the present invention.

EXAMPLE 4

Example 4 shows the effects of addition of (A) p-nitro benzoic acid, (B) m-nitro benzoic acid, or (C) p-nitro benzyl alcohol, instead of ortho-phosphoric acid as seen in Example 1. Other conditions are the same as those in Example 1 for preparing conductive composition precursor.

These precursors are also smooth liquid similar to those containing no additives. A conductive composition layer identical to that with no additives is also provided by applying these precursors to a substrate, and drying and removing the medium. A capacitor is manufactured in the same way as that in Example 1 using each of these precursors, and capacitance and withstand voltage are evaluated.

The results are shown in Table 1. It is apparent that all the capacitors in Example 4 have a higher withstand voltage than that in Comparative example 1, demonstrating the advantageous effect of the present invention.

EXAMPLE 5

An aqueous dispersion containing about 0.4 weight % colloidal poly (3,4-ethylene dioxy thiophene ) particles was first prepared by the method disclosed in Synthetic Metals (Elsevia Press), 85, pp1397. In the present example, above aqueous dispersion was used instead of poly-pyrrole solution as seen in Example 1. Other conditions are the same as those in Example 1 for preparing conductive composition precursor.

This precursor is also smooth liquid similar to those containing no additives. A conductive composition layer identical to that with no additives is also provided by applying this precursor to a substrate, and drying and removing the medium. A capacitor is manufactured in the same way as that in Example 1 using this precursor, and capacitance and withstand voltage are evaluated. The results are shown in Table 1.

COMPARATIVE EXAMPLE 2

For comparison, a capacitor without added orthophosphoric acid is manufactured in Example 5 as Comparative example 2. Capacitance and electrical breakdown voltage of this capacitor are evaluated, and the results are shown in Table 1.

Comparing the results shown in Table 1, Example 5 and Comparative example 2 both have almost the same capacitance. However, it is apparent that the capacitor in Example 5 has a higher withstand voltage, demonstrating that the present invention has better effect.

EXAMPLE 6

Example 6 shows the effects of addition of (A) n-propyl phosphoric acid, (B) isopropyl phosphoric acid, (C) n-butyl phosphoric acid, or (D) n-hexyl phosphoric acid, instead of ortho-phosphoric acid as seen in Example 5 for preparing conductive composition precursor.

These precursors are also smooth liquid similar to those containing no additives. A conductive composition later identical to that with no additives is also provided by applying these precursors to a substrate, and drying and removing the medium. A capacitor is manufactured in the same way as that in Example 1 using each of these precursors, and the same evaluations as those in Example 1 are implemented. The results are shown in Table 1. It is apparent that all the capacitors in Example 6 have a higher withstand voltage than that in Comparative example 2, demonstrating the advantageous effect of the present invention.

EXAMPLE 7

Example 7 shows the effects of addition of (A) p-nitro phenol, (B) m-nitro phenol, or (C) n-cyano phenol, instead of ortho-phosphoric acid as seen in Example 5 for manufacturing conductive composition precursor.

These precursors are also smooth liquid similar to those containing no additives. A conductive composition layer identical to that with no additives is also achieved by applying these precursors to a substrate, and drying and removing the medium. A capacitor is manufactured in the same way as that in Example 1 using these precursors, and capacitance and withstand voltage are evaluated.

Table 1 shows the results. It is apparent that all the capacitors in Example 6 have a higher withstand voltage than that in Comparison 2, demonstrating the advantageous effect of the present invention.

EXAMPLE 8

Example 8 shows the effects of addition of (A) p-nitro benzoic acid, (B) m-nitro benzoic acid, or (C) p-ntro-benzylic alcohol, instead of orthophosphoric acid as seen in Example 5.

These precursors are also smooth liquid similar to those containing no additives. A conductive composition film identical to that with no additives is also provided by applying these precursors to a substrate, and drying and removing the medium. A capacitor is manufactured in the same way as that in Example 1 using each of these precursors, and capacitance and withstand voltage are evaluated.

The results are shown in Table 1. It is apparent that all the capacitors in Example 8 have a higher withstand voltage than that in Comparative example 2, demonstrating the advantageous effect of the present invention.

EXAMPLE 9

Example 9 uses metacresol solution of poly-aniline prepared by the method disclosed in U.S. Pat. No. 5,232,631. The conductive composition precursor is manufactured in the same way as that in Example 1 except for the use of polyaniline metacresol solution instead of poly-pyrrole solution. This precursor also was smooth liquid similar to those containing no additives. A conductive composition layer identical to that with no additives is also provided by applying this precursor to a substrate, and drying and removing the medium. A capacitor is manufactured in the same way as that in Example 1 using this precursor, and capacitance and withstand voltage are evaluated. The results was shown in Table 1.

COMPARATIVE EXAMPLE 3

For comparison, a capacitor without added ortho-phosphoric acid is manufactured in Example 9 as Comparative example 3. Capacitance and electrical breakdown voltage of this capacitor are evaluated, and the results are shown in Table 1.

Comparing the results shown in Table 1, Example 9 and Comparative example 3 both have almost the same capacitance. However, it is apparent that the capacitor in Example 9 has a higher withstand voltage, demonstrating that the present invention has better effect.

EXAMPLE 10

Example 10 shows the effects of addition of (A) n-propyl phosphoric acid, (B) isopropyl phosphoric acid, (C) n-butyl phosphoric acid, or (D) n-hexyl phosphoric acid, instead of ortho-phosphoric acid as seen in Example 9 for preparing conductive composition precursor.

These precursors are also smooth liquid similar to those containing no additives. A conductive composition layer identical to that with no additives is also provided by applying these precursors to a substrate, and drying and removing the medium. A capacitor is manufactured in the same way as that in Example 1 using each of these precursors, and the same evaluations as those in Example 1 are implemented.

The results are shown in Table 1. It is apparent that all the capacitors in Example 10 have a higher withstand voltage than that in Comparative example 3, demonstrating the advantageous effect of the present invention.

EXAMPLE 11

Example 11 shows the effects of addition of (A) n-nitro phenol, (B) m-nitro phenol, or (C) p-cyano phenol, instead of ortho-phosphoric acid as seen in Example 9 for preparing conductive composition precursor.

These precursors are also smooth liquid similar to those containing no additives. A conductive composition layer identical to that with no additives is also achieved by applying these precursors to a substrate, and drying and removing the medium. A capacitor is manufactured in the same way as that in Example 1 using these precursors, and capacitance and withstand voltage are evaluated.

The results are shown in Table 1. It is apparent that all the capacitors in Example 11 have a higher withstand voltage than that in Comparative example 3, demonstrating the advantageous effect of the present invention.

EXAMPLE 12

Example 4 shows the effects of addition of (A) p-nitro benzoic acid, (B) m-nitro benzoic acid, or (C) p-ntro benzyl alcohol, instead of ortho-phosphoric acid as seen in Example 9 for preparing conductive composition precursor.

These precursors are also smooth liquid similar to those containing no additives. A conductive composition layer identical to that with no additives is also provided by applying these precursors to a substrate, and drying and removing the medium. A capacitor is manufactured in the same way as that in Example 1 using each of these precursors, and capacitance and withstand voltage are evaluated.

The results are shown in Table 1. It is apparent that all the capacitors in Example 12 have a higher withstand voltage than that in Comparative example 3, demonstrating the advantageous effect of the present invention.

EXAMPLE 13

Example 13 uses a tantalum strip with a purity of 99.99% and the same dimensions as the aluminum strip in Example 1. A voltage of 35 V is applied to the tantalum strip for an hour using 0.5% phosphoric acid solution at 90° C. to form an anodized layer. Other conditions are the same as those in Example 1 for manufacturing the capacitor. The capacitance and withstand voltage of this capacitor are evaluated in the same way as in Example 1. The results are shown in Table 1.

COMPARATIVE EXAMPLE 4

For comparison, a capacitor without added ortho-phosphoric acid is manufactured in Example 13 as Comparative example 4. Capacitance and electrical breakdown voltage of this capacitor are evaluated, and the results are shown in Table 1.

Comparing the results-shown in Table 1, Example 13 and Comparative example 4 both have almost the same capacitance. However, it is apparent that the capacitor in Example 13 has a higher withstand voltage, demonstrating that the present invention has better effect.

EXAMPLE 14

Figure 2:
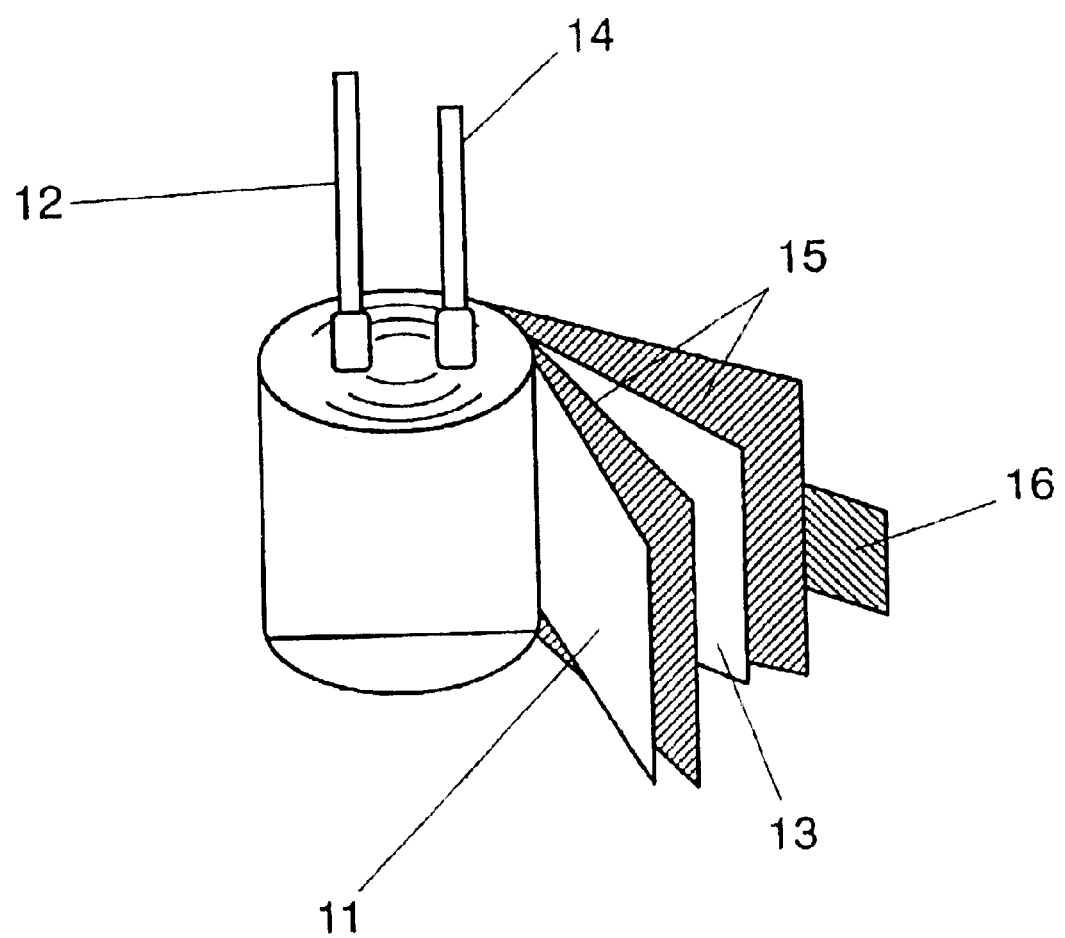
FIG. 2 is a perspective view of the capacitor in accordance with the exemplary embodiment of the present invention.

An anodized layer is formed under the same conditions as those used in Example 1, on 0.1 mm thick highly-etched aluminum foil. This etched aluminum foil is then cut into a 2.3×155 mm piece, and positive electrode lead 12 is attached to prepare capacitor positive electrode foil 11. Then, 0.05 mm thick highly-etched aluminum is cut into 2.3×180 mm piece, and negative electrode lead 14 is attached to prepare negative electrode foil 13. As shown in FIG. 2, both foils are wound together with a 2.5×220 mm separator 15 made of Manila hemp to manufacture a wound aluminum electrolytic capacitor element. Then, adhesive tape 16 is applied to one end of this capacitor element, and anodization is implemented again under the same conditions as Example 1. The capacitance of this capacitor element is 125 $\mu$F.

This capacitor element is impregnated with the conductive composition precursor manufactured in Example 1, and then dried to form the conductive composition layer.

Then, 10 g of methanol solution containing 40 weight % of iron (III) salt of naphthalene sulfonic acid and 1.6 g of pyrrole monomer are mixed at minus 30° C. The capacitor element kept at the same temperature is impregnated with the above mixed solution to laminate a poly-pyrrole layer on the conductive composition layer. The capacitor is evaluated after the polymerization residue is cleaned and dried. Table 1 shows the results.

COMPARATIVE EXAMPLE 5

For comparison, a capacitor in which the conductive composition layer is formed using the poly-pyrrole solution without added ortho-phosphoric acid is manufactured in Example 14 as Comparative example 5. This capacitor is evaluated, and the results are shown in Table 1.

Comparing the results shown in Table 1, the capacitor in Example 14 has a higher withstand voltage, demonstrating that the present invention has better effect.

In the above examples, only the use of aluminum, tantalum, and etched aluminum foil which have smooth surfaces is described. It is apparent, however, that porous tantalum sintered body is also applicable. The present invention is thus not limited by the shape of the electrode.

The above examples also only refer to the use of aluminum and tantalum as the valve metal. It is apparent that other valve metals such as niobium, titanium, and zirconium may be used as electrodes of the capacitor of the present invention. Inter metallic compounds of valve metals are also applicable to the electrode of the present invention.

Example 14 describes only the case of forming the negative electrode conductive layer by laminating a poly-pyrrole layer obtained by in-situ chemical polymerization on the conductive composition of poly-pyrrole. Other conductive polymer layers may also be laminated. The conductive polymer may also be laminated such as by electro-polymerization instead of chemical polymerization. The combination of conductive polymer in the present invention is thus not limited to types and polymerizing methods of conductive polymer.

Example 14 describes only the case of forming conductive composition using conductive composition precursor mainly consisting of poly-pyrrole and additive. It is apparent that conductive composition precursors containing other conductive polymers and additives are applicable.

The above Examples only refer to conductive composition precursor containing only soluble conductive polymer or conductive polymer particles, additives for improving the dielectric layer-forming capability and dispersing medium. However, other additives for improving adhesion to the metal foil or the conductive composition layer formed on the metal foil or the stability of the dispersion may also be used.

A range of additives may also be added to the medium for polymerization.

The conductive composition may also be formed as the negative electrode conductive layer by repeated application or immersion of the conductive composition precursor instead of laminating the conductive polymer layer by in-situ polymerization.

Other poly-thiophene derivatives in addition to conductive composition precursor made of colloidal polyethylene dioxy thiophene particles and water may be used. Other matrials may also be added to improve the film forming capability such as by changing the adhesion or wettability to the dielectric surface or separator.

The present invention thus facilitates the production of conductive composition precursor and conductive composition with high dielectric layer repairing ability in electrolytic capacitors.

Moreover, the present invention has the desirable effect of improving the withstand voltage of the capacitor because the negative electrode conductive layer made of conductive composition with high dielectric layer forming capability is formed by applying or immersing the conductive composition precursors of the present invention on the surface of the capacitor electrode.

EXAMPLE 15

As in Example 5, aqueous dispersion composition containing about 0.4 weight % of colloidal poly (3,4-ethylene dioxy thiophene) particles is prepared. The conductive composition precursor is manufactured by adding 0.2 weight % of perfluoro alkyl phosphoric acid ester which is a fluorocarbon surface active agent to this aqueous dispersion composition.

This conductive composition precursor is also smooth liquid similar to those containing no fluorocarbon surface active agent. A conductive composition film identical to that with no fluorocarbon surface active agent is also provided by applying this precursor to a substrate, and drying and removing the medium.

Next, as shown in FIG. 1, aluminum strip 1 of 99.99% purity and dimensions of 10×30×0.5 mm is prepared. After electrolytic polishing of aluminum strip 1 in sodium hydroxide solution, the strip is dipped in 3% ammonium adipate solution to a depth of approximately 20 mm, and voltage of 35 V is applied for 30 minutes at 70° C. to form anodized layer 2.

The above conductive composition precursor is applied in a 7 mm diameter circle on one side of the aluminum strip where anodized film is formed. The strip is heated at 50° C. for 60 minutes, and then at 13° C. for 20 minutes to form conductive composition layer 3 consisting of poly (3,4-ethylene dioxy thiophene) and fluorocarbon surface active agent.

Then, colloidal graphite layer 4 and silver paint layer 5 are sequentially applied to conductive composition layer 3 to form the capacitor.

Positive electrode lead 12 is attached to a portion where the anodized layer is not formed on aluminum strip 1 and a negative electrode lead is attached to silver paint layer 5. Capacitance is measured at 120 Hz.

Furthermore, a voltage is applied between both electrodes in the forward direction at an interval of 0.5 V to identify the voltage causing electrical breakdown. Table 1 shows the results.

COMPARATIVE EXAMPLE 6

For comparison, a capacitor without added fluorocarbon surface active agent is manufactured in Example 15 as Comparative example 6. Capacitance and electrical breakdown voltage of this capacitor are evaluated, and the results are shown in Table 1.

Comparing the results shown in Table 1, Example 15 and Comparative example 6 both have almost the same capacitance. However, it is apparent that the capacitor in Example 15 has a higher withstand voltage, demonstrating that the present invention has better effect.

EXAMPLE 16

Example 16 shows the effects of addition of (A) salt of perfluoro alkyl carboxylic acid, (B) perfluoro alkyl amine oxide, (C) perfluoro alkyl ethylene oxide adduct, (D) perfluoro alkyl betaine, or (E) perfluoro alkyl trimethyl ammonium salt, instead of perfluoro alkyl phosphoric acid ester as seen in Example 15.

These precursors are also smooth liquid similar to those containing no additives. A conductive composition layer identical to that with no additives is also provided by applying these precursors to a substrate, and drying and removing the medium. A capacitor is manufactured in the same way as that in Example 15 using each of these precursors, and the same evaluations as those in Example 15 are implemented.

Table 1 shows the results. It is apparent that all the capacitors in Example 16 have a higher withstand voltage than that in Comparative example 6, demonstrating the advantageous effect of the present invention.

EXAMPLE 17

First, about 1 weight % poly-pyrrole solution is prepared using the method disclosed in Chemistry of Materials (American Chemical Society), 1 (6), pp 650 (1989).

Example 17 shows the effects of addition of poly-pyrrole solution, instead of aqueous dispersion composition as seen in Example 15. Other conditions are the same as those in Example 15 for preparing conductive composition precursor.

This conductive composition precursor is also smooth liquid similar to those containing no fluorocarbon surface active agent. A conductive composition layer identical to that with no fluorocarbon surface active agent is also provided by applying this precursor to a substrate, and drying and removing the medium.

A capacitor is manufactured in the same way as that in Example 15 using this conductive composition precursor, and capacitance and withstand voltage are evaluated in the same way as in Example 15. Table 1 shows the results.

COMPARATIVE EXAMPLE 7

For comparison, a capacitor without added fluorocarbon surface active agent is manufactured in Example 17 as Comparative example 8. Capacitance and electrical breakdown voltage of this capacitor are evaluated in the same way as in Example 15, and the results are shown in Table 1.

Comparing the results shown in Table 1, Example 17 and Comparative example 7 both have almost the same capacitance. However, it is apparent that the capacitor in Example 17 has a higher withstand voltage, demonstrating that the present invention has better effect.

EXAMPLE 18

First, sulfonated poly-aniline aqueous solution composition in which about 5 weight % of soluble conductive polymer is dissolved is prepared by the method disclosed in Synthetic Metals, 85, pp 1337.

Example 18 shows the effects of using poly-aniline aqueous solution, instead of aqueous dispersion composition as seen in Example 15. Other conditions are the same as those in Example 15 for preparing conductive composition precursor.

This conductive composition precursor is also smooth liquid similar to those containing no fluorocarbon surface active agent. A conductive composition layer identical to that with no additive is also provided by applying this precursor to a substrate, and drying and removing the medium.

A capacitor is manufactured in the same way as that in Example 15 using this conductive composition precursor, and capacitance and withstand voltage are evaluated in the same way as those in Example 15. Table 1 shows the results.

COMPARATIVE EXAMPLE 8

For comparison, a capacitor without added fluorocarbon surface active agent is manufactured in Example 18 as Comparative example 8. Capacitance and electrical breakdown voltage of this capacitor arc evaluated in the same way as in Example 15, and the results are shown in Table 1.

Comparing the results shown in Table 1, Example 18 and Comparative example 8 both have almost the same capacitance. However, it is apparent that the capacitor in Example 18 has a higher withstand voltage, demonstrating that the present invention has better effect.

EXAMPLE 19

In Example 19, about 10 weight % of water soluble acrylic resin is added as a binder to the conductive composition precursor in Example 15 for manufacturing conductive composition precursor. This conductive composition precursor is smooth liquid similar to those containing no additives. A conductive composition layer identical to that with no fluorocarbon surface active agent and binder is also provided by applying this precursor to a substrate, and drying and removing the medium.

A capacitor is manufactured in the same way as that in Example 15 using this conductive composition precursor, and capacitance and withstand voltage are evaluated as those in Example 15. Table 1 shows the results. It is apparent that the capacitor in Example 19 has a higher withstand voltage than that in Comparison 6, demonstrating the advantageous effect of the present invention.

EXAMPLE 20

Example 20 shows the effects of addition of (A) polyvinyl pyrolidone, (B) polyvinyl alcohol, (C) water soluble polyester, or (D) carboxymethyl cellulose, instead of water soluble acrylic resin as seen in Example 19 for preparing conductive composition precursor.

These precursors are also smooth liquid similar to those containing no additives. A conductive composition film identical to that with no additives is also achieved by applying these precursors to a substrate, and drying and removing the medium.

A capacitor is manufactured in the same way as that in Example 15 using each of these conductive composition precursors, and the same evaluations as those in Example 15 are implemented.

Table 1 shows the results. It is apparent that all the capacitors in Example 16 have a higher withstand voltage than that in Comparative example 6, demonstrating the advantageous effect of the present invention.

EXAMPLE 21

An anodized layer is formed by immersing a 0.1 mm thick highly-etched aluminum foil into 3% ammonium adipate solution, and applying voltage of 80V at 70° C. for 30 minutes. After forming the anodizedlayer, the etched aluminum strip is cut into a 2.3×155 mm piece, and positive electrode lead 12 is attached to prepare capacitor positive electrode foil 11. Then, 0.05 mm thick highly-etched aluminum is cut into a 2.3×180 mm piece, and negative electrode lead 14 is attached to prepare negative electrode foil 13.

As shown in FIG. 2, both foils are wound together with a 2.5×220 mm separator 15 made of polyamide non-woven fabric, and adhesive tape 16 is applied to an end of this capacitor element. Re-anodization is implemented by immersing the capacitor element in 3% ammonium adipate solution, and applying 70V at 70° C. for 30 minutes. The capacitance of this wound aluminum electrolytic capacitor element is 55 $\mu$F.

This capacitor element is impregnated with the conductive composition precursor prepared in Example 15, and then heated at 50° C. for 60 minutes and at 130° C. for 20 minutes to remove the medium and form the conductive composition layer consisted of poly (3,4-ethylene dioxy thiophene) and fluorocarbon surface active agent. This is used as a base layer for the negative electrode conductive layer.

Then, 0.8 mol/l iron (III) salt of naphthalene sulfonic acid and 1.6 mol/l 3,4-ethylene dioxy thiophene monomer are mixed with methanol to prepare polymerization solution. The capacitor element is immersed in this polymerization solution for application, then heated at 50° C. for 30 minutes and at 90° C. for 30 minutes, and cleaned and dried to form the conductive polymer layer made of the poly (3,4-ethylene dioxy thiophene). The negative electrode conductive layer consisted of the conductive composition layer and conductive polymer layer is formed as described above.

Capacitance and electrical breakdown voltage of this capacitor are evaluated in the same way as that in Example 15. Table 1 shows the results.

COMPARATIVE EXAMPLE 9

For comparison, a capacitor without added fluorocarbon surface active agent to the conductive composition precursor which becomes a base layer is manufactured in Example 21 as Comparative example 9. The capacitance and electrical breakdown voltage of this capacitor are evaluated in the same way as in Example 15. Table 1 shows the results. Comparative example 9 shows the poor coverage of the conductive composition layer because the fluorocarbon surface active agent is not added to the conductive composition precursor. Moreover, the electrical breakdown voltage of the conductive composition layer is low because the fluorocarbon surface active agent which becomes an insulator after removing the medium is not added. Accordingly, as shown in Table 1, the electrical breakdown voltage of the capacitor is low and withstand characteristics are poor.

It is apparent from Comparative example 9 and Example 21 in Table 1 that Example 21 provides a capacitor with good withstand voltage by using the conductive composition layer with good withstand voltage and coverage as a base layer.

EXAMPLE 22

Example 22 uses the same capacitor element as Example 21. First, formation of the base layer is described. The capacitor element is immersed in the conductive composition precursor manufactured in Example 18 and then heated at 50° C. for 60 minutes and at 130° C. for 20 minutes to remove the medium and form the conductive composition layer consisted of poly-aniline and fluorocarbon surface active agent. This is used as a base layer for the negative electrode conductive layer.

Then, the capacitor element is immersed in methanol solution at minus 30° C. containing 0.8 mol/l iron (II) salt of naphthalene sulfonic acid and 1.4 mol/l pyrrole monomer, and then cleaned and dried to form the conductive polymer layer made of the poly-pyrrole. The negative electrode conductive layer consisted of the base layer and conductive polymer layer is thus formed. The capacitance and electrical breakdown voltage of this capacitor are evaluated in the same way as that in Example 15. Table 1 shows the results.

COMPARATIVE EXAMPLE 10

For comparison, a capacitor without added fluorocarbon surface active agent to the conductive composition precursor which becomes a base layer is manufactured in Example 22 as Comparative example 10. The capacitance and electrical breakdown voltage of this capacitor are evaluated in the same way as in Example 15. Table 1 shows the results.

Comparative example 10 shows the poor coverage of the conductive composition layer because the fluorocarbon surface active agent is not added to the conductive composition precursor. Moreover, the electrical breakdown voltage of the conductive composition layer is low because the fluorocarbon surface active agent which becomes an insulator after removing the medium is not added. Accordingly, as shown in Table 1, the electrical breakdown voltage of the capacitor is low and withstand characteristics are poor.

It is apparent from Comparative example 10 and Example 22 in Table 1 that the Example 22 provides a capacitor with good withstand voltage by using the conductive composition layer with good withstand voltage and coverage as a base layer.

EXAMPLE 23

Example 23 further adds about 10 weight % of water soluble acrylic resin as a binder to the conductive composition precursor in Example 21. Other conditions are the same as those in Example 21 for manufacturing the capacitor.

The capacitance and withstand voltage are evaluated in the same way as Example 15. Table 1 shows the results. It is apparent from Table 1 that Example 23 has a higher withstand voltage than that in Comparative example 9, demonstrating the advantageous effect of the present invention.

The above examples refer to the case of using fluorocarbon surface active agents having the perfluoro alkyl group. Other fluorocarbon surface active agents of which a part of fluorine is substituted by hydrogen are also applicable to the present invention. In addition, several types of fluorocarbon surface active agents may be mixed for use. Furthermore, fluorocarbon surface active agent and hydrocarbon surface active agent may be used together.

Examples related to the wound aluminum electrolytic capacitor refer to the use of polymerizing solution without containing fluorocarbon surface active agent or binder for the in-situ polymerization. However, fluorocarbon surface active agent or binder may be added to polymerizing solution for improving coverage or withstand voltage.

As described above, the addition of fluorocarbon surface active agent reduces surface tension, allowing to obtain conductive composition precursor with high coverage.

Moreover, addition of fluorocarbon surface active agent which becomes an insulator when the medium is removed, and further addition of binder, enable to provide conductive composition with high withstand voltage when the medium is removed from the conductive composition precursor.

EXAMPLE 24

Figure 3A:
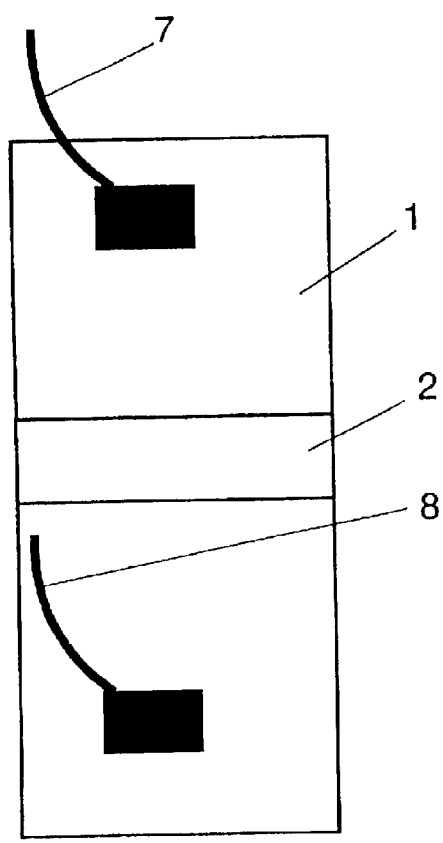
FIG. 3A illustrates a configuration of an electrode foil in accordance with the exemplary embodiment of the present invention.
Figure 3B:
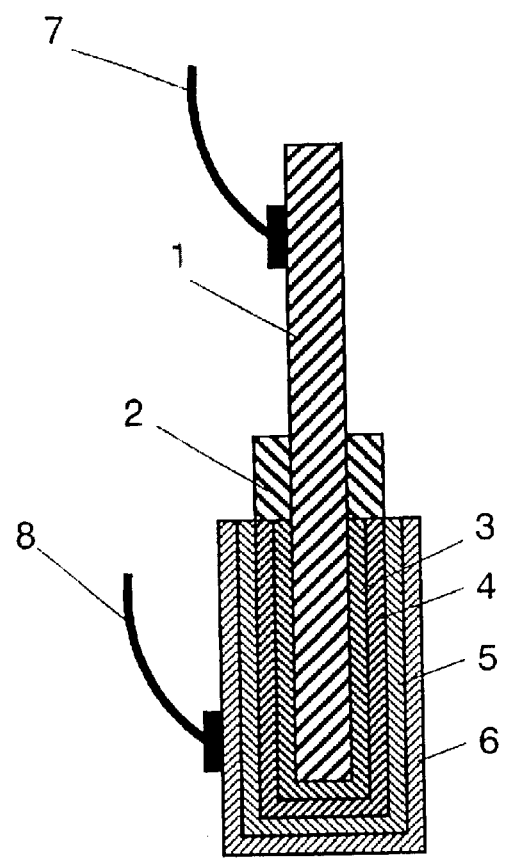
FIG. 3B is a sectional view of a configuration of a capacitor in accordance with another exemplary embodiment of the present invention.

Example 24 is described with reference to FIGS. 3A and 3B. FIG. 3A is a plan view and FIG. 3B is a sectional view of a capacitor element.

First, 1 mm width polyimide tape 2 is attached on both sides of 8 mm (L)×3.3 mm (W) etched aluminum foil 1 in a way to partition the etched aluminum foil to 4 mm and 3 mm portions.

Then, positive electrode lead 7 is attached to the 3 mm×3.3 mm portion of foil 1. Dielectric layer 3 is formed by anodizing the 4 mm×3.3 mm portion of foil 1, using 3% ammonium adipate solution at 70° C. As for anodizing conditions, the voltage is increased from 0V to 10V at the rate of 10 mV/s, and then the rated voltage of 10V is applied for 40 minutes. After rinsing under running deionized water for 10 minutes, the etched foil is dried at 105° C. for 30 minutes. This structure is considered as a capacitor, and the capacitance in the anodizing solution is measured. The capacitance is 18 μF.

Next, sulfonated polyaniline solution composition in which about 5 weight % of soluble conductive polymer is dissolved is prepared in accordance with the method disclosed in Synthetic Metals (Elsevia Press), 85, pp 1397. The conductive composition precursor is prepared by adding 0.01 mol/l of tri-isopropyl naphthalene sulfonic acid to the sulfonated polyaniline solution composition.

Then, the conductive composition precursor is applied to the 4 mm×3.3 mm portion of etched aluminum foil 1, and heated at 50° C. for 60 minutes and at 150° C. for 10 minutes to remove the medium and to form conductive composition layer 4 consisting of polyaniline and tri-isopropyl naphthalene sulfonic acid.

Next, conductive polymer layer 5 is formed on conductive composition layer 4 by chemical polymerization. First, monomer solution of 3,4-ethylene dioxy thiophene (EDOT) monomer is prepared. Oxidizing agent solution in which iron (III) salt of naphthalene sulfonic acid is dissolved in methanol is prepared. Then, the monomer solution and oxidizing agent solution are mixed to prepare the mixed solution. Here, the mixed solution is prepared to achieve the concentration of 1.6 mol/l EDOT and 0.8 mol/l iron (III) salt of naphthalene sulfonic acid. The portion of etched aluminum foil 1 where conductive composition layer 4 is formed is immersed in the mixed solution for 1 minute, and heated at 50° C. for 30 minutes and at 100° C. for 30 minutes to form conductive polymer layer 5 on conductive composition layer 4 by chemical polymerization.

Then, etched aluminum foil 1 is rinsed and dried. A process from immersion to drying is repeated for 10 times until a specified thickness is achieved for conductive polymer layer 5.

Then, collector layer 6 consisted of a carbon layer and silver paint layer is formed on conductive polymer layer 5, and negative electrode lead 8 is attached to collector layer 6.

After the attachment of the electrode lead 8, packaging with epoxy resin was performed, followed by aging to complete 10 capacitors in total.

For these 10 capacitors, the capacitance at 1 kHz, dissipation factor, impedance at 400 kHz, and leak current after applying the rated voltage of 6.3 V for 2 minutes are measured. In addition, loaded heat resistance and moisture resistance tests by applying the rated voltage under the 85° C. and 85% RH are implemented to measure capacitance, loss coefficient, impedance, and leak current. Table 2 shows the results of mean values.

In the present Example, tri-isopropyl naphthalene sulfonic acid anion contained in the conductive composition layer suppress a damage in the dielectric layer caused by small volume naphthalene sulfonic acid. Accordingly, as shown in Table 2, the solid electrolytic capacitor with low leak current, and high heat and moisture resistance is obtained. In addition, the use of an oxidizing agent having small volume naphthalene sulfonic acid anion for chemical polymerization allows to provide the solid electrolytic capacitor with high capacitance obtaining rate, as shown in Table 2. Accordingly, the present invention offers the solid electrolytic capacitor with low leak current, high heat and moisture resistances, and high capacitance obtaining rate.

COMPARATIVE EXAMPLE 10

As for Comparative example 10, a conductive composition layer is directly formed on the dielectric layer, without providing a conductive composition layer as in Example 24, for manufacturing a capacitor. The conductive composition layer is formed in the same way as Example 24. Table 2 shows the results of measured characteristics. Leak current is high in Comparative example 10, as shown in FIG. 2, because the dielectric layer is damaged by naphthalene sulfonic acid anion, and characteristics degrade in the loaded heat resistance and moisture resistance tests, resulting in a capacitor with poor characteristics.

EXAMPLE 25

Example 25 shows the effects of using aqueous dispersion composition containing poly (3,4-ethylene dioxy thiophene)

particles, instead of sulfonated polyaniline solution composition for manufacturing the capacitor in Example 24.

How the conductive composition precursor is manufactured is described next. Aqueous dispersion composition containing about 0.4 weight % of colloidal poly (3,4-ethylene dioxy thiophene) particles is prepared in accordance with the method disclosed in Synthetic Metals (Elsevia Press), 85, pp 1397. Then, 0.01 mol/l tri-isopropyl naphthalene sulfonic acid and 0.5 weight % alcoxy silane as a binder are added to the above aqueous dispersion composition for manufacturing the conductive composition precursor. A solid electrolytic capacitor is manufactured in the same way as Example 24, and evaluated. Table 2 shows the results.

Compared to Comparative example 10, Example 25 has lower leak current, higher heat resistance and moisture resistance, and higher capacitance obtaining rate, demonstrating the advantageous effect of the present invention.

EXAMPLE 26

In Example 26 the surface of the etched aluminum foil is anodized in the same way as Example 24 at 70° C. using solution containing 0.05 mol/l ammonium salt of tri-isopropyl naphthalene sulfonic acid for forming the dielectric layer. The capacitance of the capacitor in the anodizing solution is 17.8 $\mu$F.

Then, the conductive polymer layer is formed by chemical polymerization, in the same way as Example 24 on the dielectric layer, using EDOT as monomer and iron (III) salt of naphthalene sulfonic acid as an oxidizing agent.

Next, the collector layer consisted of the carbon layer and silver paint layer is formed on the conductive polymer layer, and the negative electrode lead is attached on the collector layer. After packaging with epoxy resin, aging is applied to complete 10 capacitors in total. These capacitors are measured in the same way as those in Example 24. Table 2 shows the results.

Tri-isopropyl naphthalene sulfonic acid anion included or present near the surface of the dielectric layer by anodization suppresses a damage to the dielectric layer in the present Example. Accordingly, as shown in Table 2, the solid electrolytic capacitor with low leak current and high heat and moisture resistances is obtained.

The use of an oxidizing agent containing small volume naphthalene sulfonic acid anion, as in the present Example, allows to provide the solid electrolytic capacitor with high capacitance obtaining rate, as shown in Table 2. Accordingly, the solid electrolytic capacitor with low leak current, high heat and moisture resistances, and high capacitance obtaining rate isobtained.

EXAMPLE 27

The surface of the etched aluminum foil is anodized in the same way as in Example 24 to form the dielectric layer. Then, the conductive polymer layer is formed by chemical polymerization, in the same way as in Example 24 on the dielectric layer, using EDOT as monomer and iron (III) salt of naphthalene sulfonic acid as an oxidizing agent.

Next, re-anodization is implemented using anodizing solution in which 0.01 mol/l tri-isopropyl naphthalene sulfonic acid is dissolved in ethylene glycol. More specifically, a portion of the etched aluminum foil where conductive polymer layer is formed is impregnated with the anodizing solution at 70° C. The voltage is increased from 0V to 8.5V at the rate of 10 mV/s, and then the rated voltage of 8.5V are applied for 40 minutes for re-anodization. Then, rinsing and drying are implemented.

The collector layer consisted of the carbon layer and silver paint layer is formed on the conductive polymer layer, and then the negative electrode lead is attached.

After packaging with epoxy resin, aging is applied to complete 10 capacitors in total. These capacitors are measured in the same way as those in Example 24. Table 2 shows the results.

Tri-isopropyl naphthalene sulfonic acid anion used in Example 27 has high repairing ability, and thus no large current flows during re-anodization, preventing decomposition of the conductive polymer layer. Accordingly, the solid electrolytic capacitor with low leak current, without degrading the dissipation factor or impedance, is obtained.

COMPARATIVE EXAMPLE 11

As for Comparative example, a capacitor is manufactured by re-anodization using 0.5 mol/l of ammonium adipate, instead of tri-isopropyl naphthalene sulfonic acid as seen in Example 27. Table 2 shows measuring results.

Since ammonium adipate in the capacitor of Comparative example 11 has low repairing ability, large current flows during re-anodization, decomposing the conductive polymer layer. It is apparent from Table 2 that the dissipation factor and impedance are high and leak current is also large.

The above Examples refer to the case of using tri-isopropyl naphthalene sulfonic acid anion as alkyl naphthalene sulfonic anion. Other anionic materials such as mono-isopropyl naphthalene sulfonic acid anion, n-butyl naphthalene sulfonic acid anion, di-butyl naphthalene sulfonic acid anion, and tri-isopropyl naphthalene di-sulfonic acid anion may also be used. The present invention is thus not limited to types of anion.

The above Examples also refer to the case of using iron (III) salt of naphthalene sulfonic acid as an oxidizing agent having small volume anion. Other substances such as iron (III) salt of benzene sulfonic acid, benzene di-sulfonic acid, ethyl benzene sulfonic acid, dodecyl benzene sulfonic acid, and paratoluene sulfonic acid are applicable. The present invention is thus not limited to types of compounds as long small volume anion is contained.

The above Examples also refer to the case of using ammonium salt of tri-isopropyl naphthalene sulfonic acid and tri-isopropyl naphthalene sulfonic acid separately as electrolyte of the anodizing solution. However, these electrolytes may be mixed with other electrolytes such as adipic acid, boric acid, acetic acid, phosphoric acid, and their salts.

The above Examples refer to the use of EDOT as monomer and iron (III) salt of naphthalene sulfonic acid as an oxidizing agent, and the conductive polymer layer is formed by chemical polymerization. However, other monomers and oxidizing agents are applicable. The present invention is thus not limited to types of monomers and oxidizing agents.

The above Examples also refer to the formation of the conductive composition layer by chemical polymerization. However, electropolymerization may be applied after chemical polymerization to form laminated conductive polymer layers.

In the above Examples, only the use of flat etched aluminum foil is described. It is apparent, however, that the present invention is applicable to capacitors made of porous sintered body or those in which the positive electrode foil and negative electrode foil are wound through with the separator. The present invention is thus not limited by the shape of the electrode.

As described above, the use of alkyl naphthalene sulfonic acids or their salts contained in the conductive composition layer suppresses a damage to the dielectric layer caused by small volume anion such as para-toluene sulfonic acid anion and naphthalene sulfonic acid anion. Accordingly, the solid electrolytic capacitor with low leak current and high heat and moisture resistance is obtained. When an oxidizing agent having small volume anion such as para-toluene sulfonic acid anion and naphthalene sulfonic acid anion is used, the solid electrolytic capacitor with high capacitance obtaining rate is obtained. Accordingly, the present invention has an advantageous effect of manufacturing the solid electrolytic capacitor with low leak current, high heat and moisture resistances, and high capacitance obtaining rate.

Alkyl naphthalene sulfonic acid anion included or present near the surface of the dielectric layer by anodization in the present invention suppresses a damage to the dielectric layer, enabling the achievement of a solid electrolytic capacitor with low leak current and high heat and moisture resistances. The use of small volume anion such as para-toluene sulfonic acid anion and naphthalene sulfonic acid anion as an oxidizing agent also enables the achievement of a solid electrolytic capacitor with high capacitance obtaining rate.

Second Exemplary Embodiment

In the second exemplary embodiment the anodized film surface of the solid electrolytic capacitor is treated with at least one selected from silane coupling agent, titanium coupling agent, borane coupling agent, and aluminum coupling agent. Further, a coupling agent layer and a layer made of surface active agent showing high affinity to this coupling agent are provided to prevent direct contact between the anodized film-defect portion and the conductive polymer for improving the withstand voltage.

In other words, the second exemplary embodiment provides a layer consisted of a coupling agent and surface active agent between an electrode on which an anodized film is formed and a negative electrode conductive layer made of conductive polymer.

Existence of an insulating layer consisted of coupling agent and surface active agent in the second exemplary embodiment also significantly improves leak current characteristics. Since the thickness of the coupling agent and surface active agent layer are extremely thin, there is no noticeable drop in the capacitance or increase in high frequency impedance by the insertion of the insulating layer. On contrary, the penetration of the coupling agent and surface active agent deep into an etching pit of positive electrode valve metal or sintered body allows to wet the electrode surface, increasing the capacitance of the capacitor by broadening an area covered with conductive polymer.

Fluorocarbon surface active agents in which hydrogen in the alkyl group are substituted with fluorine are preferable in this exemplary embodiment. These types of surface active agents have high permeability as well as high heat resistance. They also show high affinity to the coupling agent.

Coupling agents having the above functions are listed below:

Silane coupling agent: Vinyl tri-chloro silane, vinyl (β-methoxy silane), vinyl tri-ethoxy silane, γ-methachryloiloxy silane, β-(3,4-epoxy cyclohexyl) ethyl-tri-methoxy silane, γ-glysidyloxy propyl tri-methoxy silane, N-β(amino ethyl) γ-amino propyl methoxy silane, γ-amino propyl tri-ethoxy silane, N-phenyl-γ-amino propyl methoxy silane, γ-mercapto propyl methoxy silane, and γ-chloro propyl tri-methoxysilane.

Titanium coupling agent: Iso-propyl tri-isostealoil titanate, iso-propyl tris (dioxyl pyrophsophite) titanate, iso-propyl tri(N-amino ethyl-amino ethyl)titanate, tetra-octhyl bis (di-tridecyl phosphite) titanate, tetra (2,2-diaryl oxymethyl-1-butyl) bis (di-tridecyl) phosphite titanate, bis (di-octyl pyrophosphate)oxy acetate titanate, bis(doctyl pyrophsopahte)ethylene titanate, isopropyl tri-octhanoil-titanate, iso-propyl di-methacryl iso-stealoil titanate, isopropyl tri-dodecyl benzene sulfonyl titanate, isopropyl isostearoil diacryl titanate, isopropyl tri(dioctyl phosphate) titanate, isopropyl tri-cumyl phenyl titanate, and tetra-isopropyl bis(dioctyl phosphite)titanate.

Aluminum coupling agent: Aceto alcoxyl aluminum di-iso propylate.

Other than these compounds, borane coupling agents are applicable.

As for surface active agents, nonionic surface active agents as well as anionic surface active agents are applicable. These surface active agents are listed below:

Anionic surface active agents: Fatty acid soap,-sulfated oil, higher alcohol, sulfuric acid ester of olefin or alkyl ether, alkyl sulfonate, alkyl aryl sulfonate, sulfo succinic acid ester, fatty acid amido sulfonate, alkyl phosphoric acid ester, and alkyl ether phosphoric acid ester.

Nonionic surface active agents: Alkyl ether, alkyl phenyl ether, alkyl phenyl ether condensate, alkyl ester, alkyl amine, alkyl amido, polyoxy propylene ether, condensated oil ether, aryl phenyl ether, glycerine fatty acid ester, sorbitane fatty acid ester, poly-oxyethylene sorbitane fatty acid ester, alcanol amido, and polyether.

Surface active agents having the structure that hydrogen in the hydrophobic group is substituted with fluorine have high permeability, particularly preferable for wetting the electrode surface having fine surface structure, and high heat resistance.

Fluorocarbon surface active agents having the molecular structure of fluorine bound to carbon in the hydrophobic group are listed below.

Fluorocarbon surface active agent: perfluoro alkyl carbonate, perfluoro alkyl phosphoric acid ester, perfluoro alkyl tri-methyl ammonium, perfluoro alkyl betaine, perfluoro alkyl amine oxide, and perfluoro alkyl EO adducts.

The hydroxyl group exists on the anodized electrode surface, and the coupling agent, such as silane coupling agent described below, forms a strong organic layer by chemically reacting with the hydroxyl group.

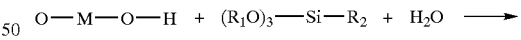

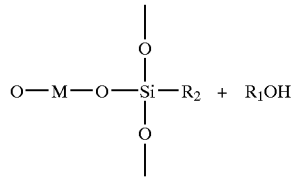

M: metal atom $R_1$, $R_2$: organic radical

Other coupling agents also form an extremely thin and strong organic film on an inorganic surface by the same structure. The present invention further forms the surface active agent layer on the coupling agent layer for preventing direct contact of the conductive polymer layer, formed on the surface active agent layer, and dielectric-layer defect portion. This allows to provide a capacitor with good leak current and withstand voltage characteristics.

The use of surface active agent also improves the wettability between the conductive polymer layer forming solution and coupling agent, increasing the coverage of the conductive polymer layer and capacitance obtaining rate.

The coupling agent layer is formed by impregnating a capacitor unit with the coupling agent solution using an appropriate solvent, and then eveporating the solvent.

The conductive polymer layer is formed by applying pre-polymerized conductive polymer particles or soluble conductive polymer dispersed or dissolved in the medium containing a surface active agent, using an appropriate method.

Conductive polymer may also be formed by in-situ polymerization in a polymerizing medium containing monomer, oxidizing agent, and surface active agent for forming the negative electrode conductive layer.

The above combinations also allow to form the negative electrode conductive layer made of the conductive polymer layer. For the above purpose, conductive polymer having pyrrole, thiophene, aniline, or their derivatives as a repeating unit may be used.

As for thiophene derivatives, 3,4-ethylene dioxy thiophene may be used. As for aniline derivatives, sulfonated aniline may be used.

In-situ polymerization is applicable by electro-polymerization as well as chemical oxidative polymerization. Specific examples are described below with reference to FIGS. 4 and 5.

EXAMPLE 28

Figure 4:
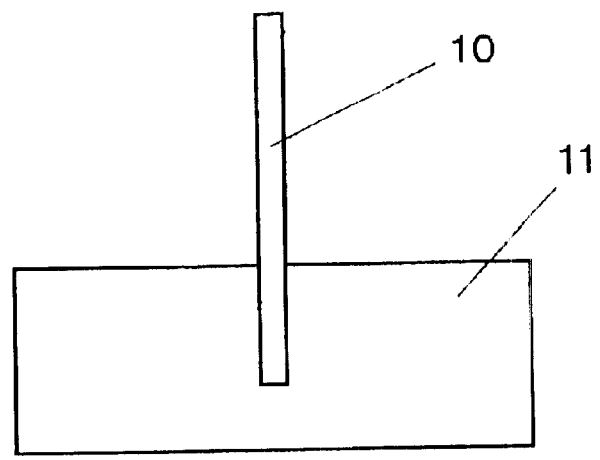
FIG. 4 illustrates a configuration of an electrode foil in accordance with another exemplary embodiment of the present invention.
Figure 5:
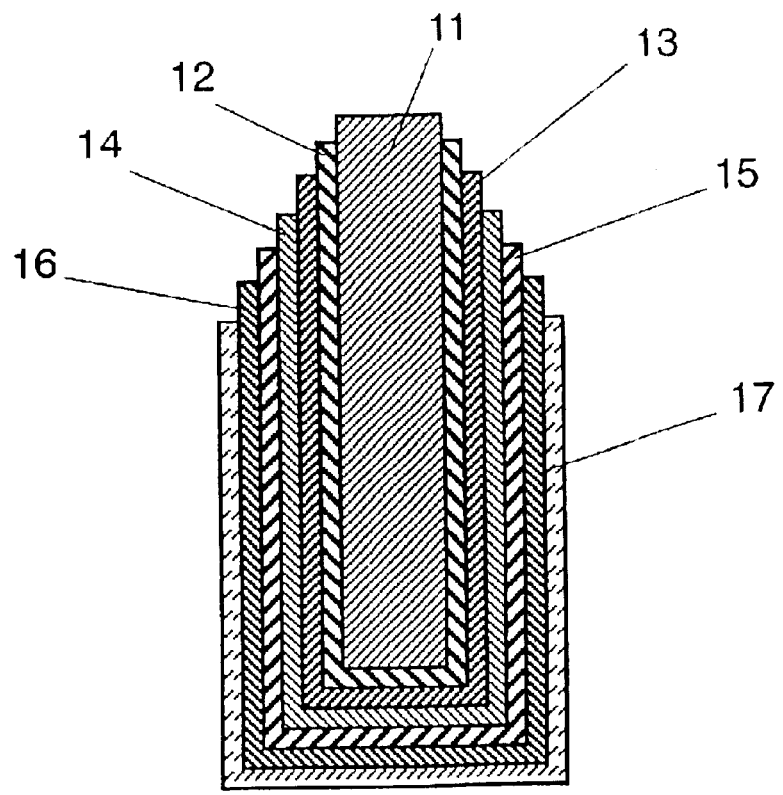
FIG. 5 is a sectional view of a configuration of a capacitor in accordance with another exemplary embodiment of the present invention.

As shown in FIG. 4, a voltage of 35V is applied lo electrode foil 11 made of a 8×20 mm etched aluminum foil to which positive electrode lead 10 of 0.5 aluminum is attached is etched, using 3% ammonium adipate solution at about 70° C. to form dielectric layer 12 made of an anodized film as shown in FIG. 5 for the positive electrode of the capacitor.

This electrode foil 11 is immersed in 1% solution of (A) γ-grycidoxy propyl trimethyl silane, (B) γ-methacryloxy propyl trimethoxysilane, and (C) N-β(aminoethyl) γ-aminopropyl trimethoxy silane, and then air dried at 110° C. to form coupling agent layer 13.

These silane coupling agents are supplied by Shin Etsu Chemicals Industry in the trade name KBM403, KBM503, and KBM 603, which are easily available on the market.

Then, the above positive electrode is impregnated with the polypyrrole solution containing 0.1% perfluoro alkyl phosphoric acid ester, which is a surface active agent, and air dried. The surface active agent whose hydrogen in the alkyl group is substituted with fluorine is supplied by Asahi Glass Co., Ltd. in the trade name Surflon, and is easily available on the market. The surface active agent used in Example 28 is Surflon S112.

The polypyrrole solution is prepared in accordance with a method disclosed by E. E. Havinga et al, Chemistry of Materials (American Chemical Society),1 (6), pp650 (1989).

The immersion and air-dry processes are repeated until electrode foil 11 is completely covered to form surface active agent layer 14 and conductive polymer layer 15.

Colloidal graphite and silver paint are then applied sequentially to form graphite layer 16 and silver paint layer 17, completing five capacitors with a sectional structure shown in FIG. 5.

The capacitance, tan δ at 1 kHz and leak current after applying 13V for 2 minutes are measured. Table 3 shows mean values of the measurements. The withstand voltage when a voltage in the forward direction is applied at the voltage raising speed of 40 mV/sec is 24V, 25V, and 23V respectively for (A), (B), and (C).

COMPARATIVE EXAMPLE 12

As for comparison, five capacitors without treatment of (A) Silane coupling agent KBM403 and five capacitors with no additive of (B) Surflon S112 are manufactured in Example 28 as Comparative example 12. The capacitance, tan δ, and leak current are evaluated in the same way as Example 28. Table 3 shows the results. Withstand voltage of (A) and (B) in Comparative example 12 are 16V and 18V respectively.

Comparing the results shown in Table 3, high leak current is noticed when no silane coupling agent treatment is applied, and only a capacitor with small capacitance is obtained without fluorocarbon surface active agent.

In other words, it can be assumed that a thin layer of silane coupling agent and fluorocarbon surface active agent acts as an insulating layer to reduce leak current and increase withstand voltage. In addition, the fluorocarbon surface active agent improves the wettability between the silane coupling agent layer and polypyrrole solution, increasing the capacitance and reducing tan δ of the capacitor by improved coverage.

EXAMPLE 29

Example 29 shows the effects of using (A) Surflon S111 (salt of perfluoro carboxylic acid) and (B) Surflon S141 (perfluoro alkyl amine oxide), instead of Surflon S112 as seen in Example 28 after treating with the silane coupling agent KBM 403. Five capacitors are manufactured with (A) and (B) respectively for evaluation.

Table 3 shows the results. It is apparent that all the capacitors in Example 29 have a higher capacitance, good tan δ, and good leak current characteristics than that in Comparative example 12, demonstrating the advantageous effect of the present invention.

EXAMPLE 30

Example 30 shows the effects of using titanium coupling agents (A) isopropyl tri-isostearoil titanate and (B) tetraoctyl bis (di-tridecyl phosphate) titanate, and aluminum coupling agent: (C) acetoalcoxyl aluminum di-isoproplylate, instead of the silane coupling agent as seen in Example 28. Five capacitors are manufactured with (A), (B), and (C) respectively for evaluation.

The above titanium and aluminum coupling agents are supplied by Ajinomoto K. K. in the trade name of Plainact TTS, Plainact 46B, and Plainact AL-M, which are easily available on the market.

Table 3 shows evaluation results of the capacitors. It is apparent that all the capacitors in Example 30 have a higher capacitance, good tan δ, and good leak current characteristics than those in Comparative example 12, demonstrating the advantageous effect of the present invention.

EXAMPLE 31

Example 32 shows the effects of using 0.4% colloidal polyethylene di-oxy thiophene particle dispersion, instead of the poly-pyrrole solution as seen in Example 28.

Capacitors are evaluated in the same way as Example 28. Table 3 shows the results. It is apparent that all the capacitors in Example 31 have a higher capacitance, better tan δ, and better leak current characteristics than those in Comparative example 12, demonstrating the advantageous effect of the present invention.

EXAMPLE 32

Example 32 shows the effects of immersing the foil in the dispersion once, instead of repeatedly immersing in the colloidal polyethylene di-oxy thiophene dispersion as seen in Example 31, for forming the negative electrode conductive layer, and the polyethylene dioxy thiophene layer is laminated by in-situ chemical polymerization. Other conditions are the same as those in Example 28 for preparing five capacitors.

The capacitor element is impregnated with methanol solution containing 1.9M ethylene di-oxy thiophene monomer and 1.1M iron (III) salt of para-toluene sulfonic acid once and then heated at 45° C. and 85° C. for 1 hour each for in-situ polymerization of polyethylene dioxy thiophene. After polymerization, the capacitor element is rinsed with methanol and water to remove polymerization residue.

Capacitors are evaluated in the same way as Example 28.

Table 3 shows the results. It is apparent that all the capacitors in Example 33 have a higher capacitance, better tan δ, and better leak current characteristics than that in Comparative example 12, demonstrating the advantageous effect of the present invention.

EXAMPLE 33

Example 33 uses 1% poly-anilne aqueous solution. Water solubility is given to the polymer by introducing the sulfone group to the aniline structure.

Example 33 shows the effects of using the poly-aniline solution, instead of colloidal polyethylene dioxy thiophene solution as seen in Example 32, for forming five capacitors, and they are evaluated. Table 3 shows the results. It is apparent that all the capacitors in Example 33 have a higher capacitance, better tan δ, and better leak current characteristics than that in Comparative example 12, demonstrating the advantageous effect of the present invention.

EXAMPLE 34

Example 34 shows the effects of laminating poly-pyrolle layers by in-situ polymerization, instead of polyethylene dioxy thiophene layers by in-situ polymerization as seen in Example 32, for forming five capacitors.

The capacitor element is immersed alternatively in the monomer solution containing 0.75M pyrrole monomer, 0.04M sodium salt of tri-isopropyl naphthalene sulfonic acid and 0.1 weight % Surflon S112; and the oxidizing agent solution containing 0.4M ferric sulfate and 0.1 weight % Surflon S12 for in-situ polymerization of polypyrrole. The conductive polymer is polymerized at room temperature for 1 hour.

Table 3 shows the evaluation of the capacitors. It is apparent that all the capacitors in Example 34 have a higher capacitance, better tan δ, and better leak current characteristics than that in Comparative example 12, demonstrating the advantageous effect of the present invention.

EXAMPLE 35

Example 35 shows the effects of using an embossed tantalum foil of 99.99% purity and the same dimensions, instead of the aluminum strip as seen in Example 28. A tantalum lead of 0.5 mm diameter is welded to this tantalum foil. After forming the anodized film on the tantalum foil by applying 35V for 1 hour using 0.5% phosphoric acid solution at 90° C., capacitors are manufactured in the same way as Example 32. Table 3 shows the results of evaluation. Measured withstand voltage is 28V.

COMPARATIVE EXAMPLE 13

For comparison, five capacitors without (A) treatment with silane coupling agent KBM 403 in Example 32 and without (B) addition of Surflon S112 in Example 35 are manufactured as Comparative example 13.

Capacitance, tan δ, and leak current are evaluated, and the results are shown in Table 3. Measured withstand voltage is 22V for (A) and 24V for (B).

It is apparent from Table 3 that capacitors without silane coupling agent treatment show large leak current, and those without using fluorocarbon surface active agent show small capacitance.

Capacitors of Examples of the present invention thus have larger capacitance, better tan δ and leak current characteristics, and higher withstand voltage, demonstrating that the present invention has better effect.

Examples of the present invention only refer to the foil structure of the valve metal electrode. However, elements which have a structure to wind the negative electrode foil and positive electrode foil together with the separator in advance are also applicable, and porous sintered elements made of fine valve metal powder are further applicable. The present invention is thus not limited to electrode structures.

The above Examples only refer to the use of aluminum or tantalum as valve metals. However, other valve metals such as titanium, zirconium, and niobium are applicable.

The above Examples only refer to the structure of surface active agent whose hydrogen in the hydrophobic group is all substituted with fluorine. However, those having high wettability even with remaining hydrogen are also applicable.

In case of thiophene and aniline conductive polymers, the above Examples only refer to those having one type of substitute group. However, as long as conductivity is sufficiently high, those having other substitute groups are also applicable. Conductive polymers with other structure may also be applied.

The above Examples only refer to methods for forming the conductive polymer layer using conductive polymer dispersion or solution independently or further laminating conductive polymer by in-situ polymerization after the formation of the conductive polymer layer.

However, the conductive polymer layer may also be formed only by in-situ polymerization. The present invention is thus not limited to the conductive polymer layer formation methods.

The above examples only refer to chemical polymerization as a method for forming conductive polymer by in-situ polymerization. However, it is apparent that electro-polymerization is also applicable.

Examples of the present invention enables to provide a solid electrolytic capacitor with good leak current characteristics and high withstand voltage by the formation of extremely thin insulating layer on the dielectric surface.

In addition, the use of fluorocarbon surface active agent having high wettability in conductive polymer dispersion or in in-situ polymerization medium enables to significantly improve the coverage and adhesion of conductive polymer,

What is claimed is:

1. A method of manufacturing a solid electrolytic capacitor comprising:
   preparing a valve metal electrode on which an anodized layer is formed;
   preparing conductive composition precursor in which:
   A) one of solution composition containing soluble conductive polymer and dispersion composition containing conductive polymer particles; and
   B) at least one of "one of phosphoric acid and phosphoric acid ester compounds", "one of phenol and phenol derivative", "nitrobenzene derivatives", "alkyl naphthalene sulfonic acid anion", "fluorocarbon surface active agents" and "fluorocarbon surface active agent and binders" are dissolved or dispersed in a medium;
   applying said conductive polymer precursor on said valve metal electrode; and
   removing said medium from said conductive polymer precursor.

2. The method of manufacturing a solid electrolytic capacitor as defined in claim 1, wherein said one of phosphoric acid and phosphoric acid ester compounds has at least one active hydrogen.

3. The method of manufacturing a solid electrolytic capacitor as defined in claim 1, wherein said phenol derivatives have at least one electron-attracting substitute group.

4. The method of manufacturing a solid electrolytic capacitor as defined in claim 1, wherein said phenol derivative is one of nitro phenol and cyano phenol.

5. The method of manufacturing a solid electrolytic capacitor as defined in claim 1, wherein said nitrobenzene derivative is one of nitro benzoic acid and nitrobenzyl alcohol.

6. The method of manufacturing a solid electrolytic capacitor as defined in claim 1, wherein said fluorocarbon surface active agent has a perfluoro alkyl group.

7. The method of manufacturing a solid electrolytic capacitor as defined in claim 1, wherein said fluorocarbon surface active agent is one of anionic, nonionic, amphoteric, and cationic surface active agents.

8. The method of manufacturing a solid electrolytic capacitor as defined in claim 1, wherein said soluble conductive polymer and said conductive polymer particles is one of poly-pyrrole, poly-thiophene, poly-aniline, and their derivatives.

9. The method of manufacturing a solid electrolytic capacitor as defined in claim 1, wherein said alkyl naphthalene sulfonic acid anion is included in one of free acid, sodium salt and ammonium salt thereof.

10. The method of manufacturing a solid electrolytic capacitor as defined in claim 1, wherein said valve metal is one of aluminum, tantalum, niobium, titanium, and zirconium.

11. A method of manufacturing a solid electrolytic capacitor comprising:
   forming a dielectric layer by anodizing the surface of a valve metal using anodizing solution containing alkyl naphthalene sulfonic acid anion; and
   forming a conductive polymer layer on said dielectric layer.

12. The method of manufacturing a solid electrolytic capacitor as defined in claim 11 further comprising re-anodizing said dielectric layer on which said conductive polymer layer is formed.

13. The method for manufacturing a solid electrolytic capacitor as defined in claim 11, wherein said alkyl naphthalene sulfonic acid anion is included in one of free acid, sodium salt and ammonium salt thereof.

14. A method of manufacturing a solid electrolytic capacitor comprising:
   forming an anodized layer on a valve metal;
   forming a coupling agent layer on said anodized layer; and
   forming a surface active agent layer and a conductive polymer layer on said coupling agent layer by applying a medium, in which conductive polymer containing said surface active agent is dispersed or dissolved, to said coupling agent layer.

15. The method of manufacturing a solid electrolytic capacitor as defined in claim 14, wherein said forming said coupling agent layer includes a step of applying one of coupling agent and its solution to said anodized layer.

16. The method of manufacturing a solid electrolytic capacitor as defined in claim 14, wherein said coupling agent is one of silane coupling agent, titanium coupling agent, borane coupling agent, and aluminum coupling agent.

17. The method for manufacturing a capacitor as defined in claim 14 further comprising a step of laminating said conductive polymer layer by in-situ polymerization using a medium containing monomer.

18. The method for manufacturing a capacitor as defined in claim 14 further comprising a step of laminating said conductive polymer layer by in-situ polymerization using a medium containing monomer and said surface active agent.

19. The method of manufacturing a solid electrolytic capacitor as defined in claim 14, wherein said surface active agent is one of anionic surface active agent and nonionic surface active agent.

20. The method of manufacturing a solid electrolytic capacitor as defined in claim 14, wherein said surface active agent has a hydrophobic group structured with fluorocarbon.

21. The method of manufacturing a solid electrolytic capacitor as defined in claim 14, wherein said valve metal is one of aluminum, tantalum, niobium, titanium-, and zirconium.

22. The method of manufacturing a solid electrolytic capacitor as defined in claim 14, wherein said conductive polymer has one of pyrrole, thiophene, aniline and their derivatives as a repeating unit.

23. The method of manufacturing a solid electrolytic capacitor as defined in claim 14, wherein said thiophene derivative is 3,4-ethylene dioxy thiophene and said aniline derivative is sulfonated aniline.

24. A method of manufacturing a solid electrolyte capacitor comprising:
   forming an anodized layer on a valve metal;
   forming a coupling agent layer on said anodized layer; and
   forming a surface active agent layer, wherein said surface active agent has a hydrophobic group structured with fluorocarbon, and a conductive polymer layer on said coupling agent layer.

* * * * *